(12) United States Patent
Vetillard

(10) Patent No.: US 8,935,746 B2
(45) Date of Patent: Jan. 13, 2015

(54) SYSTEM WITH A TRUSTED EXECUTION ENVIRONMENT COMPONENT EXECUTED ON A SECURE ELEMENT

(71) Applicant: Oracle International Corporation, Redwood Shores, CA (US)

(72) Inventor: Eric Vetillard, Valbonne (FR)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 13/867,481

(22) Filed: Apr. 22, 2013

(65) Prior Publication Data

US 2014/0317686 A1     Oct. 23, 2014

(51) Int. Cl.
  *G06F 7/04*   (2006.01)
  *G06F 21/00*   (2013.01)

(52) U.S. Cl.
  CPC ..................... *G06F 21/00* (2013.01)
  USPC .............................................................. 726/2

(58) Field of Classification Search
  USPC ............................................................ 726/2
  See application file for complete search history.

(56) References Cited

U.S. PATENT DOCUMENTS 6,988,147 B2 *  1/2006  King ................................ 709/239
7,113,994 B1 *  9/2006  Swift et al. .................... 709/229
8,701,199 B1 *  4/2014  Dotan et al. ...................... 726/25
2007/0016774 A1 *  1/2007  Bakshi ............................ 713/168
2010/0192217 A1 *  7/2010  Arnold ............................. 726/13

FOREIGN PATENT DOCUMENTS

WO     2005071925 A2     8/2005

OTHER PUBLICATIONS http://www.oracle.com/technetwork/java/javame/javacard/overview/about/index.html, last visited Mar. 28, 2013.
GlobalPlatform, GlobalPlatform Device Technology—TEE System Architecture, Version 1.0, Public Release, Dec. 2011, GPD_SPE_009.
http://www.occamsec.com/Mobile_Devices_Securityissues_and_Implications.pdf, last visited Mar. 28, 2013.
http://www.omtp.org/OMTP_Advanced_Trusted_Environment_OMTP_TR1_v1_1.pdf, last visited Mar. 28, 2013.
GlobalPlatform, GlobalPlatform Device—Secure Element Remote Application Management, Version 1.0, Public Release, May 2011, GPD_SPE_008.

(Continued)

*Primary Examiner* — Teshome Hailu
(74) *Attorney, Agent, or Firm* — Miles & Stockbridge P.C.

(57) ABSTRACT

A distributed trusted execution environment is provided for a device, where the distributed trusted execution environment is split into two components: a trusted execution environment that is executed on a tamper-resistant secure element, and a trusted execution environment proxy that is executed on the device. The trusted execution environment proxy acts a proxy between the trusted execution environment that is executed on the secure element, and one or more hardware components or software components of the device.

28 Claims, 5 Drawing Sheets

(56) References Cited

OTHER PUBLICATIONS

GlobalPlatform, GlobalPlatform Device Technology—Secure Element Access Control, Version 1.0, Public Release, May 2012, GPD_SPE_013.

ARM, Securing the System with Trustzone Ready Program—Securing Your Digital World, http://www.arm.com/files/pdf/Tech_seminar_TrustZone_v7_PUBLIC.pdf, last visited Mar. 28, 2013.

* cited by examiner

SYSTEM WITH A TRUSTED EXECUTION ENVIRONMENT COMPONENT EXECUTED ON A SECURE ELEMENT

FIELD

One embodiment is directed to a computer system, and more particularly, to a computer system that provides a trusted execution environment.

BACKGROUND

Devices, such as mobile devices and embedded devices, face security issues that generally cannot be addressed solely using software solutions. For example, platform limitations that are generally inherent within mobile devices and embedded devices, such as slower and less capable processors, can affect: whether encryption can be used and to what strength; password/passphrase complexity; how a security mechanism can interact with a user; and security support for the platform. As another example, operating systems of mobile devices or embedded devices can be created
with a focus on proliferation (e.g., ease-of-use, more accessible). Such a focus can be at odds with security measures and technologies, and can leave operating systems of such devices more vulnerable to security risks.

Some devices offer a specific hardware security mechanism that defines a trusted execution mode, which can provide exclusive access to sensitive hardware components and/or sensitive data, and can provide an initial execution before a main operating system executes. This security mechanism can allow a single processor to host two different execution environments. One execution environment is a standard execution environment, which can provide a standard operating environment defined by a standard execution mode. The other execution environment is a trusted environment, (i.e., trusted execution environment or "TEE"), defined by the trusted execution mode. The TEE can be isolated from the standard environment, down to the hardware layer. The processor can ensure that some operations are only possible within the TEE, and the isolation of the TEE from the standard execution environment can increase the difficulty of starting a software security attack from the standard execution environment.

SUMMARY

One embodiment is directed to a system that implements a distributed trusted execution environment. The system includes a trusted execution environment proxy executed within a first trusted execution environment. The system further includes a client application executed within an operating system environment. The system further includes a trusted application executed within a second trusted execution environment of a secure element. The trusted execution environment proxy receives a request to establish a session between the client application and the trusted application, where the request to establish the session is received from the client application. The trusted execution environment proxy further selects the trusted application. The trusted execution environment proxy further sends the request to establish the session to the trusted application. The trusted execution environment proxy further receives a response to the request to establish the session from the trusted application. The trusted execution environment proxy further sends the response to the request to establish the session to the client application, where the session between the client application and the trusted application is established through the trusted execution environment proxy.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

In one embodiment, a distributed TEE is provided for a device, where the distributed TEE is split into two components: a TEE that is executed on a secure element, and a TEE proxy that is executed on the device. The TEE proxy acts a proxy between the TEE on the secure element, and one or more hardware components or software components of the device. Thus, one or more client applications can be executed on the device, where the one or more client applications can access the one or more hardware components or software components of the device, where one or more trusted applications can be executed within the TEE that is executed on the secure element, and where the one or more client applications can communicate with the one or more trusted applications using the TEE proxy. A "trusted execution environment" or "TEE" is a secure execution environment that is isolated from other execution environments, which provides security from software attacks that originate outside the TEE through hardware mechanisms that other execution environments cannot control, and that supports access to one or more secured hardware components by one or more trusted applications. Further, a "secure element" is any tamper-resistant hardware platform that provides security from software attacks (and certain hardware attacks) that originate outside the secure element through hardware mechanisms that applications outside the secure element cannot control, where one or more software components can be executed on the tamper-resistant hardware platform. Typically, a secure element can provide a higher degree of security than a TEE. Additionally, a "trusted application" is an application configured to secure data.

Figure 1:
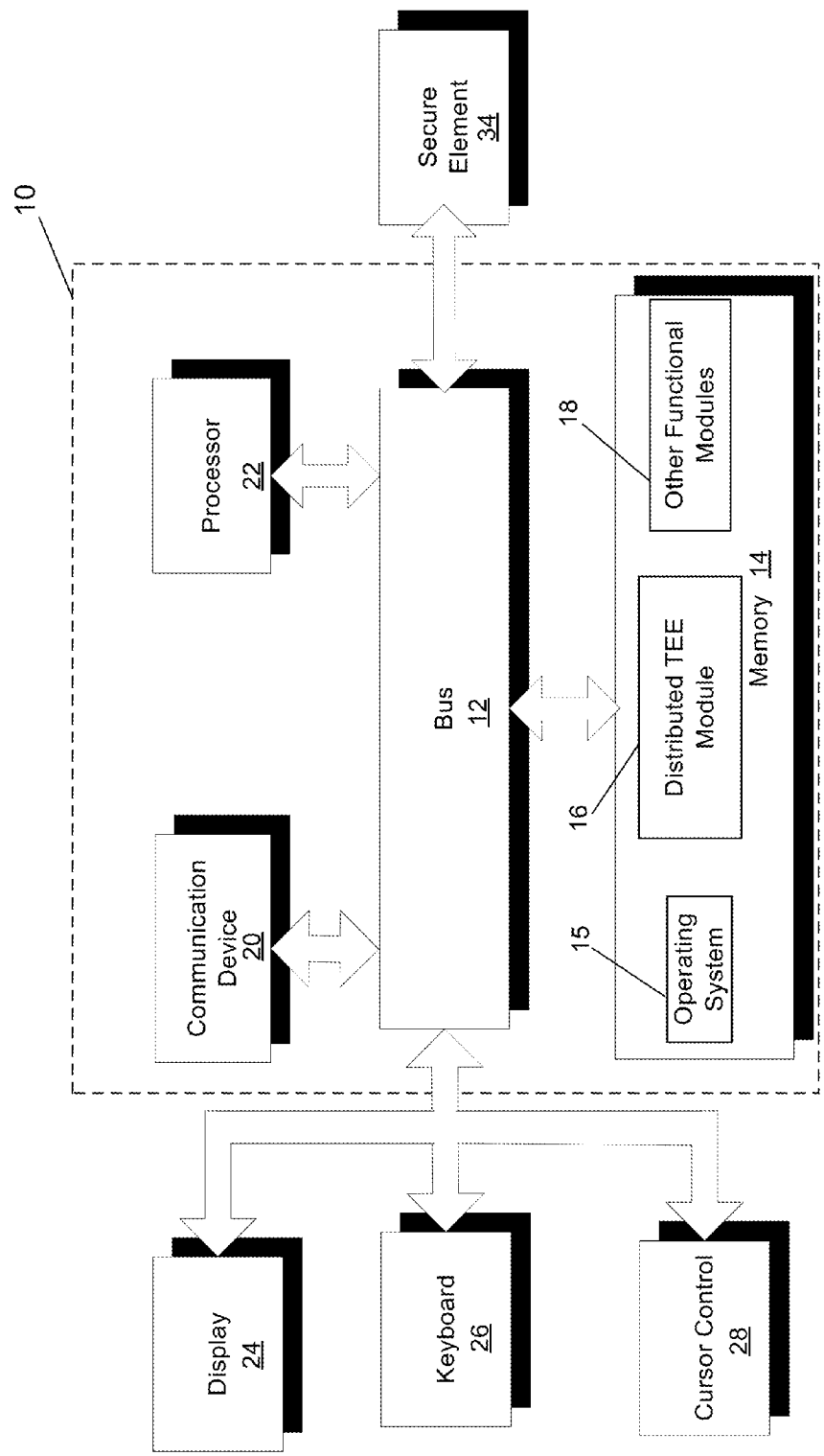
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a distributed TEE module 16, as well as other functional modules 18. Operating system 15 can provide an operating system functionality for system 10. Distributed TEE module 16 can provide functionality for implementing a distributed TEE, as will be described in more detail below. In certain embodiments, Distributed TEE module 16 can comprise a plurality of modules, where each module provides specific individual functionality for implementing a distributed TEE. System 10 can also be part of a larger system. Thus, system 10 can include one or more additional functional modules 18 to include the additional functionality. For example, functional modules 18 may include modules that provide additional functionality, such as the "Java Card" platform from Oracle Corporation.

Processor 22 can also be operatively coupled via bus 12 to a secure element 34. Secure element 34 can be any tamper-resistant hardware platform that provides security from software attacks that originate outside the hardware platform through hardware mechanisms that applications outside the hardware platform cannot control, where one or more software components can be executed on secure element 34. In certain embodiments, secure element 34 can be embedded within system 10. In other alternate embodiments, secure element 34 can be removable from system 10. In certain embodiments, secure element 34 can be at least one of the following: a chipset, a secured microcontroller, a universal integrated circuit card, a memory card, a smart card, or a subscriber identity module card.

Figure 2:
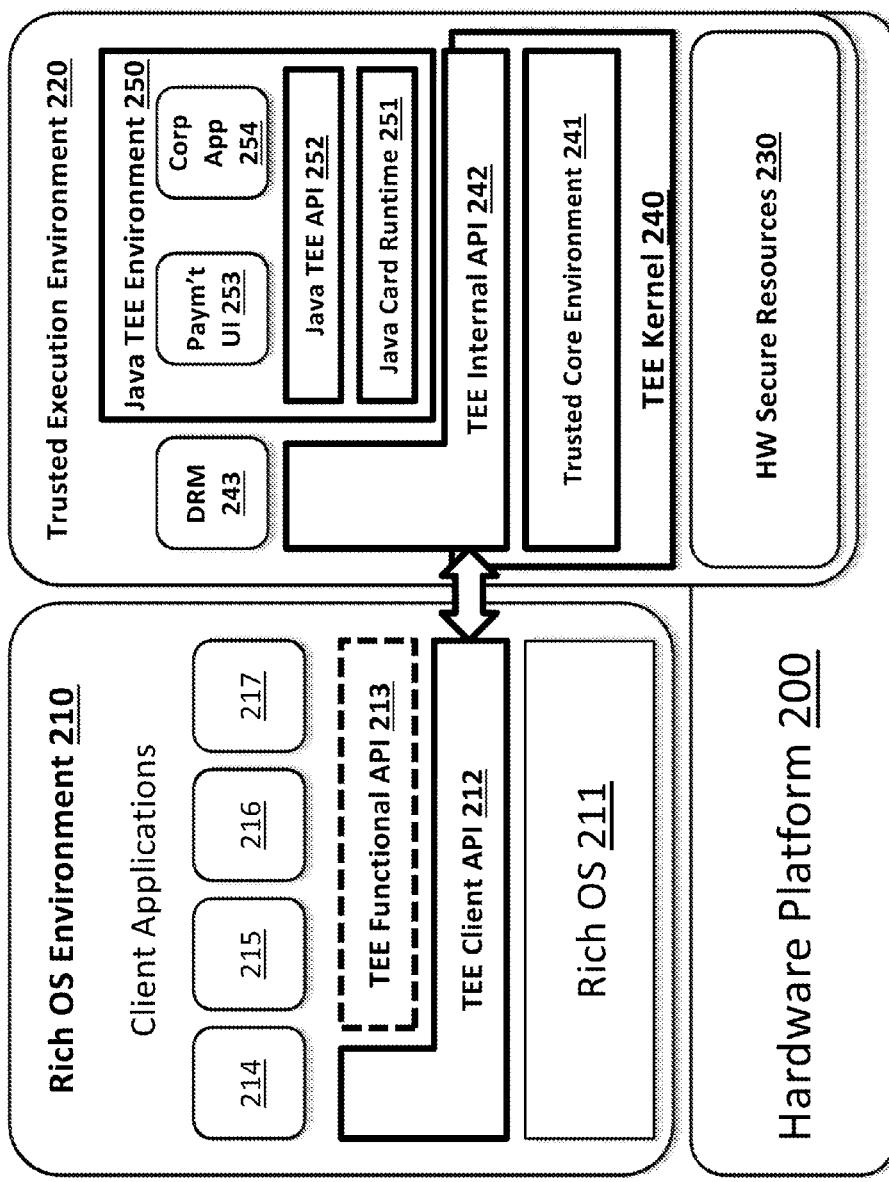
FIG. 2 illustrates a block diagram of a conventional system that can implement a TEE.

FIG. 2 illustrates a block diagram of a "conventional" system that can implement a TEE. The system can be part of a device. The system includes hardware platform 200. Hardware platform 200 is a collection of one or more hardware components. In certain embodiments, hardware platform 200 can be at least one of a chipset, an integrated circuit, a processor, a microprocessor, a digital signal processor, or another type of embedded system.

The system further includes rich operating system environment 210 (identified in FIG. 2 as "Rich OS Environment 210"). Rich operating system environment 210 is an execution environment configured to provide a rich operating system 211 (identified in FIG. 2 as "Rich OS 211") for the overall system. An "execution environment" is a set of hardware components and software components (such as system software, embedded software, software applications, etc.) that supports one or more applications executed within the execution environment. Examples of a rich operating system include a Linux operating system, a Windows® operating system, an Android operating system, etc. Rich operating system environment 210 further includes a TEE client application programming interface ("API") 212, and a TEE functional API 213. TEE client API 212 and TEE functional API 213 are each an API that allows an application that is executed within rich operating system environment 210 to interface with a TEE, such as TEE 220, which is described below in greater detail. Rich operating system environment 210 further includes one or more client applications, such as client applications 214, 215, 216, and 217. A client application is an application that is executed within rich operating system environment 210, and that interfaces with a TEE, such as TEE 220, using either TEE client API 212 or TEE functional API 213. One of ordinary skill in the art would readily appreciate that the number of client applications illustrated in FIG. 2 is only an example number of client applications, and that rich operating system environment 210 can include any number of client applications.

The system further includes TEE 220. As previously described, TEE 220 is a secure execution environment that is isolated from other execution environments, that provides security from software attacks that originate outside TEE 220 through hardware mechanisms that other execution environments cannot control, and that supports access to one or more secured hardware components by one or more trusted applications. More specifically, TEE 220 is an execution environment for which: (a) any software components, such as computer programs, modules, or applications, that are executed within TEE 220 are trusted in authenticity and integrity; (b) TEE 220 can resist software attacks, and thus, can protect one or more hardware components within TEE 220; and (c) both hardware components and software components are protected from unauthorized tracing and control through debug and test features. TEE 220 also defines safeguards as to which hardware components and software components an application that is external to TEE 220 can access.

The system further includes one or more secured hardware components 230 (identified in FIG. 2 as "HW Secure Resources 230"). Secured hardware components 230 are hardware components of hardware platform 200 that are secured so that only trusted applications, such as trusted applications 243, 253, and 254 (which are described below in greater detail) can access them. Examples of secured hardware components 230 include a secure element, a key, a secure storage, a trusted user interface (such as a keypad or screen), a crypto accelerator, a controller, etc.

TEE 220 further includes TEE kernel 240. TEE kernel 240 is a component that can allow one or more software components of TEE 220 to communicate with one or more hardware components of TEE 220, such as secured hardware components 230, and thus, can act as a bridge between the one or more software components and the one or more components. A "kernel" is a main component of an execution environment that is configured to communicate with hardware components and software components, and that acts a bridge between the hardware components and the software components. TEE 220 further includes trusted core environment 241. Trusted core environment 241 is an environment that includes one or more functions for communicating with one or more hardware components of TEE 220, such as secured hardware components 230. TEE 220 further includes TEE internal API 242. TEE internal API 242 is an API that allows a trusted application that is executed within TEE 220 to interface with a rich operating system environment, such as rich operating system environment 210. TEE 220 further includes digital rights management ("DRM") application 243. DRM application 243 is an example of a trusted application that is executed within TEE 220. In this example, DRM application 243 can control access to digital content. One of ordinary skill in the art would readily appreciate that any number of trusted applications can be executed within TEE 220.

TEE 220 further includes Java TEE environment 250. Java TEE environment 250 is a specialized type of TEE that uses a Java runtime environment to execute one or more trusted applications. Java TEE environment 250 includes Java Card runtime environment 251 (identified in FIG. 2 as "Java Card Runtime 251"). Java Card runtime environment 251 is a runtime environment that can execute Java Card applications, where the runtime environment is implemented on top of TEE kernel 240 and trusted core environment 241, using TEE internal API 242, which is used to develop native trusted applications, such as DRM application 243. Java TEE environment 250 further includes Java TEE API 252. Java TEE API 252 is a specialized type of TEE internal API that allows a trusted application that is executed within Java TEE environment 250 to access the features implemented in TEE kernel 240 and trusted core environment 241. In particular, Java TEE API 252 includes a trusted application framework that provides an interface with a rich operating system environment, such as rich operating system environment 210. Java trusted applications can also be included in Java TEE environment 250, such as payment user interface ("UI") application 253 (identified in FIG. 2 as "Paym't UI 253") and corporation application 254 (identified in FIG. 2 as "Corp App 254"). Payment UI application 253 and corporate application 254 are examples of trusted applications that are executed within Java TEE environment 250. In this example, payment UI application 253 is a trusted application that implements trusted user interactions during a payment interaction performed on rich operating system environment 210, possibly involving a secure element, and corporate application 254 is a trusted application that stores and accesses secured corporate data within trusted execution environment 220.

An issue with a TEE is that the trusted mode may not be tamper-resistant. In other words, the TEE can resist software attacks, but it may not provide protection against all hardware attacks. Many devices include a tamper-resistant secure element (such as a chipset, a secured microcontroller, a universal integrated circuit card, a memory card, a smart card, or a subscriber identity module card), where the secure element includes its own hardware components (such as a processor or memory), where the secure element can be protected against hardware attacks. Sensitive data can be stored in such a secure element, and can be secured from both software and hardware attacks.

Thus, according to an embodiment of the invention, the TEE is implemented as a distributed TEE, where the distributed TEE is split into two components: a TEE that is executed on the tamper-resistant secure element, and a TEE that is executed on the device, and that includes a TEE proxy. The TEE proxy is a "proxy application" that can communicate with the TEE that is executed on the secure element, and thus, acts a proxy between the TEE on the secure element, and one or more client applications executed on the device. One or more trusted applications are executed within the TEE that is executed on the secure element, with the TEE proxy providing a trusted communication channel between the one or more trusted applications and the one or more client applications. A "proxy application" or "proxy" is any application that is configured to communicate with another application. The distributed TEE is, thus, able to leverage the enhanced security benefits of the tamper-resistant secure element. Further, this represents a fundamental paradigm shift in trusted environments. In previous systems, in order to provide a tamper-resistant secure element, access to one or more hardware components of the secure element was generally exclusive to trusted applications executed within the secure element. Thus, access to the one or more hardware components was generally not provided to applications executed outside of the secure element. However, according to an embodiment of the invention, a TEE proxy, executed within a device, is able to communicate with a TEE executed within a secure element. Through this communication, the TEE proxy is able to access one or more trusted applications of the secure element.

Figure 3:
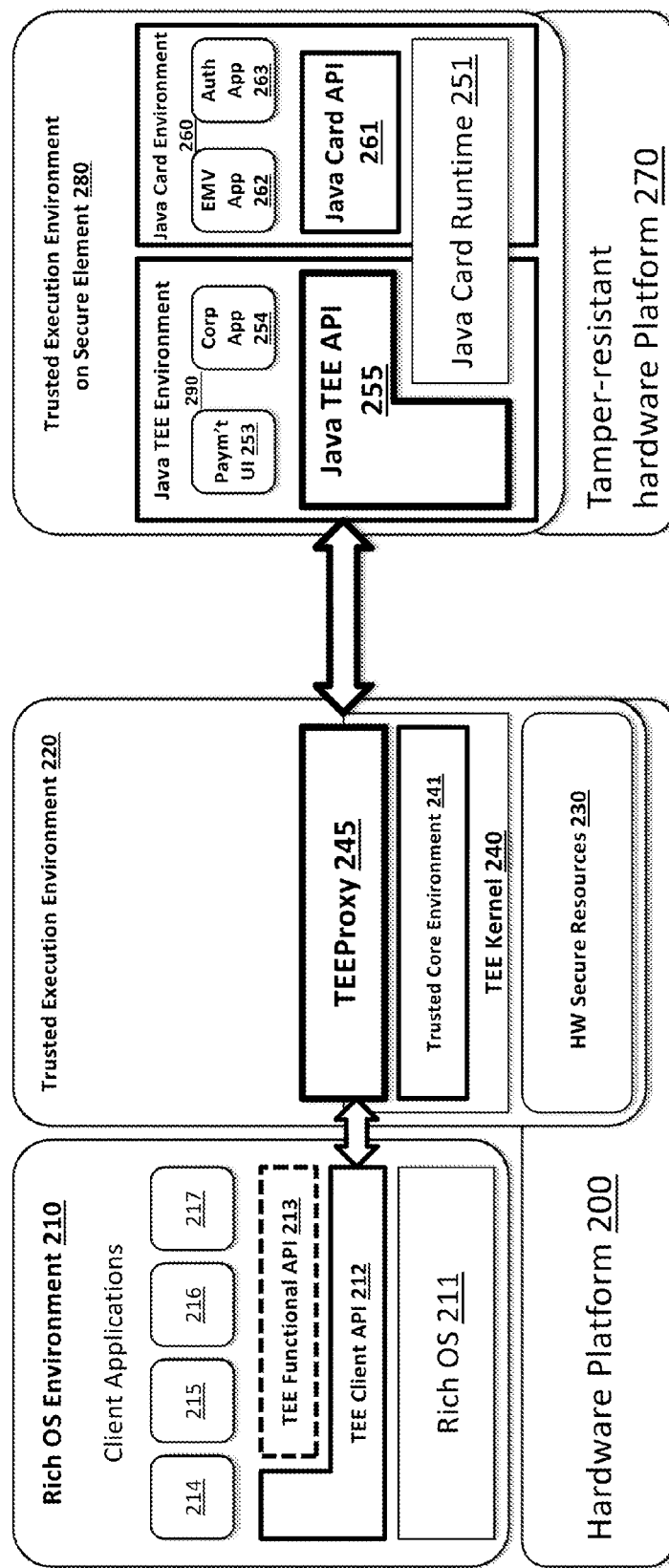
FIG. 3 illustrates a block diagram of a system that can implement a distributed TEE, where a TEE component of the distributed TEE is executed on a secure element, according to an embodiment of the invention.

FIG. 3 illustrates a block diagram of a system that can implement a distributed TEE, where a TEE component of the distributed TEE is executed on a secure element, according to an embodiment of the invention. In one embodiment, the system can be part of a device. Some of the components of the system illustrated in FIG. 3 are identical to the components of the system illustrated in FIG. 2, and are not described again in conjunction with the system illustrated in FIG. 3. The system includes TEE 220, which is a TEE component of the distributed TEE, and which is executed on hardware platform 200. TEE 220 of FIG. 3 is similar to TEE 220 of FIG. 2, but TEE 220 of FIG. 3 includes TEE kernel 240, trusted core environment 241, and TEE proxy 245. TEE proxy 245 is a proxy application, executed within TEE 220, that facilitates communications between one or more client applications that are executed within rich operating system environment 210, such as client applications 214, 215, 216, and 217, and one or more trusted applications that are executed within TEE 280 (where TEE 280 is further described below in greater detail), such as trusted applications 253, 254, 262, and 263. Thus, TEE proxy 245 acts as a communication layer between rich operating system environment 210 and TEE 280.

More specifically, a client application that is executed within rich operating system environment 210 can establish a connection with TEE proxy 245, and can send one or more requests to execute an operation to TEE proxy 245. TEE proxy 245 can receive the one or more requests, and establish a connection with TEE 280. TEE proxy 245 can further send one or more requests to execute an operation to a trusted application that is executed within TEE 280. TEE proxy 245 can further receive one or more responses from the trusted application that is executed within TEE 280. TEE proxy 245 can further send the one or more responses to the client application that is executed within rich operating system environment 210. The processing of one or more requests to execute an operation by TEE proxy 245 is further described below in greater detail in conjunction with FIG. 4. Further, in certain embodiments, TEE proxy 245 can further receive one or more requests to execute an operation within TEE kernel 240 from a trusted application that is executed within TEE 280. TEE proxy 245 can further send one or results of an operation executed within TEE kernel 240 to the trusted application that is executed within TEE 280. The processing of one or more requests to execute an operation within TEE kernel 240 by TEE proxy 245 is also further described below in greater detail in conjunction with FIG. 4. Further, TEE proxy 245 can establish a secure connection between itself and TEE 280, so that all communications between TEE proxy 245 and a trusted application that is executed within TEE 280 are cryptographically protected. The establishing of a secure connection is further described below in greater detail in conjunction with FIG. 5.

The system further includes tamper-resistant hardware platform 270. Tamper-resistant hardware platform 270 is a hardware platform that provides security from software attacks (and certain hardware attacks) that originate outside the hardware platform through hardware mechanisms that applications outside the hardware platform cannot control, where one or more software components can be executed on tamper-resistant hardware platform 270. Tamper-resistant hardware platform 270 can also be identified as a secure element. In certain embodiments, tamper-resistant hardware platform 270 can be at least one of the following: a chipset, a secured microcontroller, a universal integrated circuit card, a memory card, a smart card, or a subscriber identity module card.

The system further includes TEE 280, where TEE 280 is a TEE component of the distributed TEE that is executed on tamper-resistant hardware platform 270 (identified in FIG. 3 as "Trusted Execution Environment on Secure Element 280"). TEE 280 of FIG. 3 is similar to TEE 220 of FIG. 2, but TEE 280 is executed on tamper-resistant hardware platform 270, rather than hardware platform 200. Further, according to the embodiment, TEE 280 includes Java TEE environment 280, and Java TEE environment 280 includes Java TEE API 255. Java TEE API 255 is a specialized type of TEE internal API that facilitates communication between TEE proxy 245 and one or more trusted applications that are executed within Java TEE environment 280, such as trusted applications 253 and 254. Thus, Java TEE API 255 acts as a communication layer between TEE proxy 245 and TEE 280. One of ordinary skill in the art would readily appreciate that any number of trusted applications can be executed within Java TEE environment 280.

As is further described below in greater detail, Java TEE API 255 further facilitates communication between TEE proxy 245 and Java Card API 261, and thus, further facilitates communication between TEE proxy 245 and one or more trusted applications that are executed within Java Card environment 260, such as trusted applications 262 and 263. In certain embodiments, Java TEE API 255 can establish a secure connection between Java TEE API 255 and Java Card API 261.

According to the embodiment, Java TEE API 255 can receive one or requests to execute an operation from TEE proxy 245. Java TEE API 255 can further send the one or more requests to execute an operation to a trusted application that is executed within TEE 280. Java TEE API 255 can further receive one or more responses from the trusted application that is executed within TEE 280. Java TEE API 255 can further send the one or more responses to TEE proxy 245. The processing of one or more requests to execute an operation by Java TEE API 255 is further described below in greater detail in conjunction with FIG. 4. Further, in certain embodiments, Java TEE API 255 can further send one or more requests to execute an operation within TEE kernel 240 to TEE proxy 245. Java TEE API 255 can further receive one or results of an operation executed within TEE kernel 240, and send the one or more results of the operation executed within TEE kernel 240 to the trusted application that is executed within TEE 280.

The processing of one or more requests to execute an operation within TEE kernel 240 by Java TEE API 255 is also further described below in greater detail in conjunction with FIG. 4.

According to the embodiment, TEE 280 also includes Java Card environment 260. Java Card environment 260 is a standard implementation of the Java Card Classic specification, as generally found in secure elements, that executes one or more applets that are implemented using Java Card API 261, and that relies on one or more smart card protocols to communicate with the outside world. Java Card environment 260 (and Java TEE environment 280) include Java Card runtime environment 251 (illustrated in FIG. 3 as "Java Card Runtime 251"). Java TEE Environment 290 also includes Java TEE API 255. Java TEE API 255 is a specialized type of TEE internal API that facilitates communication between TEE proxy 245 and one or more trusted applications that are executed within Java TEE Environment 290, such as trusted applications 253 and 254. The implementation of Java TEE API 255 also delegates the execution of some operations to TEE 220, when these operations need to access some of hardware platform 200's secure resources (identified in FIG. 2 as "HW Secure Resources 230"). In that case, Java TEE API 255 sends a request to TEE proxy 245, which executes the request using one or more functions of trusted core environment 241, and then returns the result of the execution to Java TEE API 255. Java Card environment 260 further includes Europay, MasterCard, and VISA ("EMV") application 262 (identified in FIG. 3 as "EMV App") and authentication application 263 (identified in FIG. 3 as "Auth App"). EMV application 262 and authentication application 263 are examples of Java Card Classic applications that are executed within Java Card environment 260. In this example, EMV application 262 is an applet implemented using a Java Card platform that can perform financial transactions using secured financial data stored and managed by the applet on tamper-resistant hardware platform 270. Authentication application 263 is a Java Card Classic application also implemented using a Java Card platform that can access secured authentication stored and managed by an applet on tamper-resistant hardware platform 270. One of ordinary skill in the art would readily appreciate that any number of trusted applications can be executed within Java Card environment 260. In alternate embodiments, Java Card environment 260 can be omitted.

Figure 4:
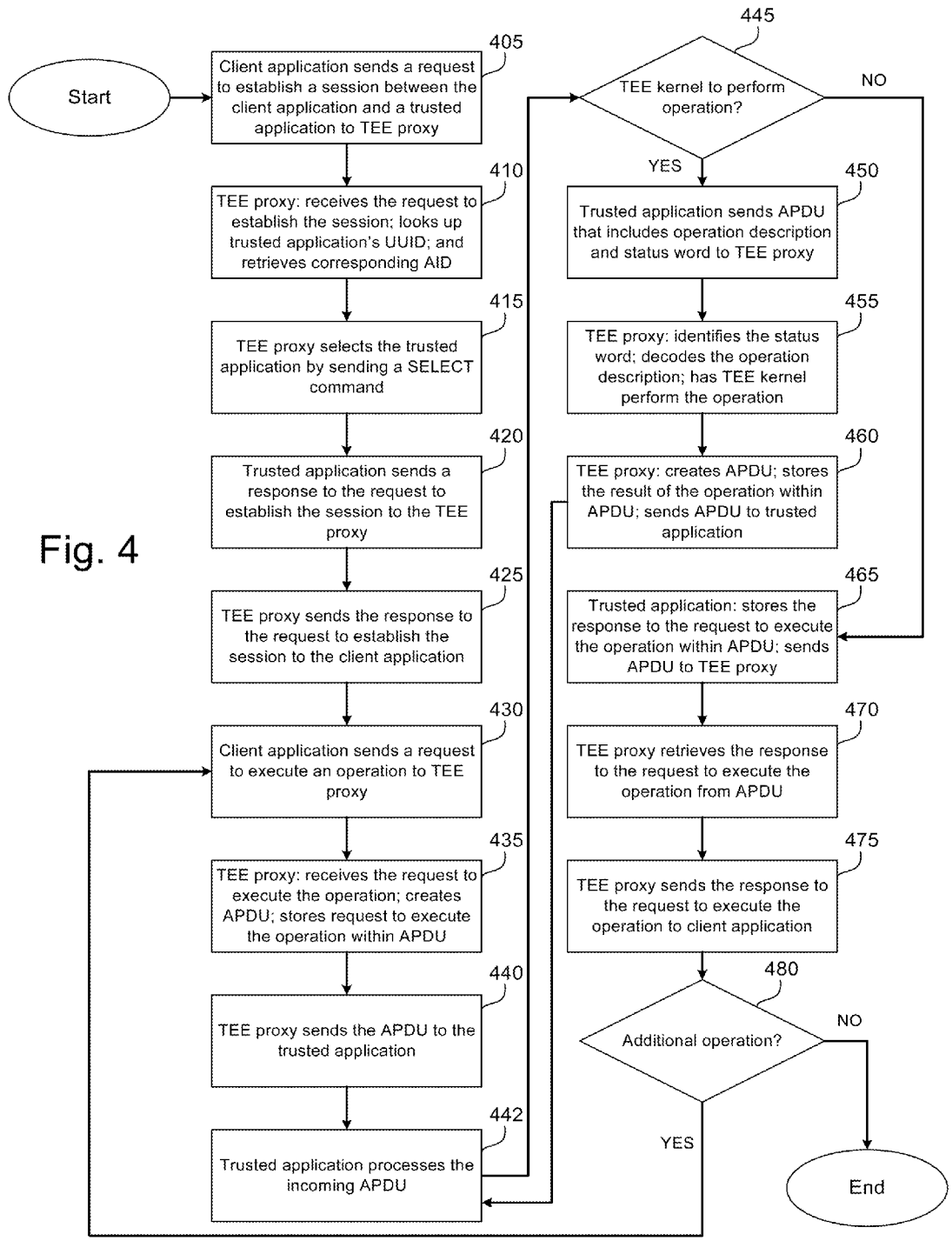
FIG. 4 illustrates a flow diagram of the functionality of a distributed TEE module that implements a distributed TEE according to an embodiment of the invention.
Figure 5:
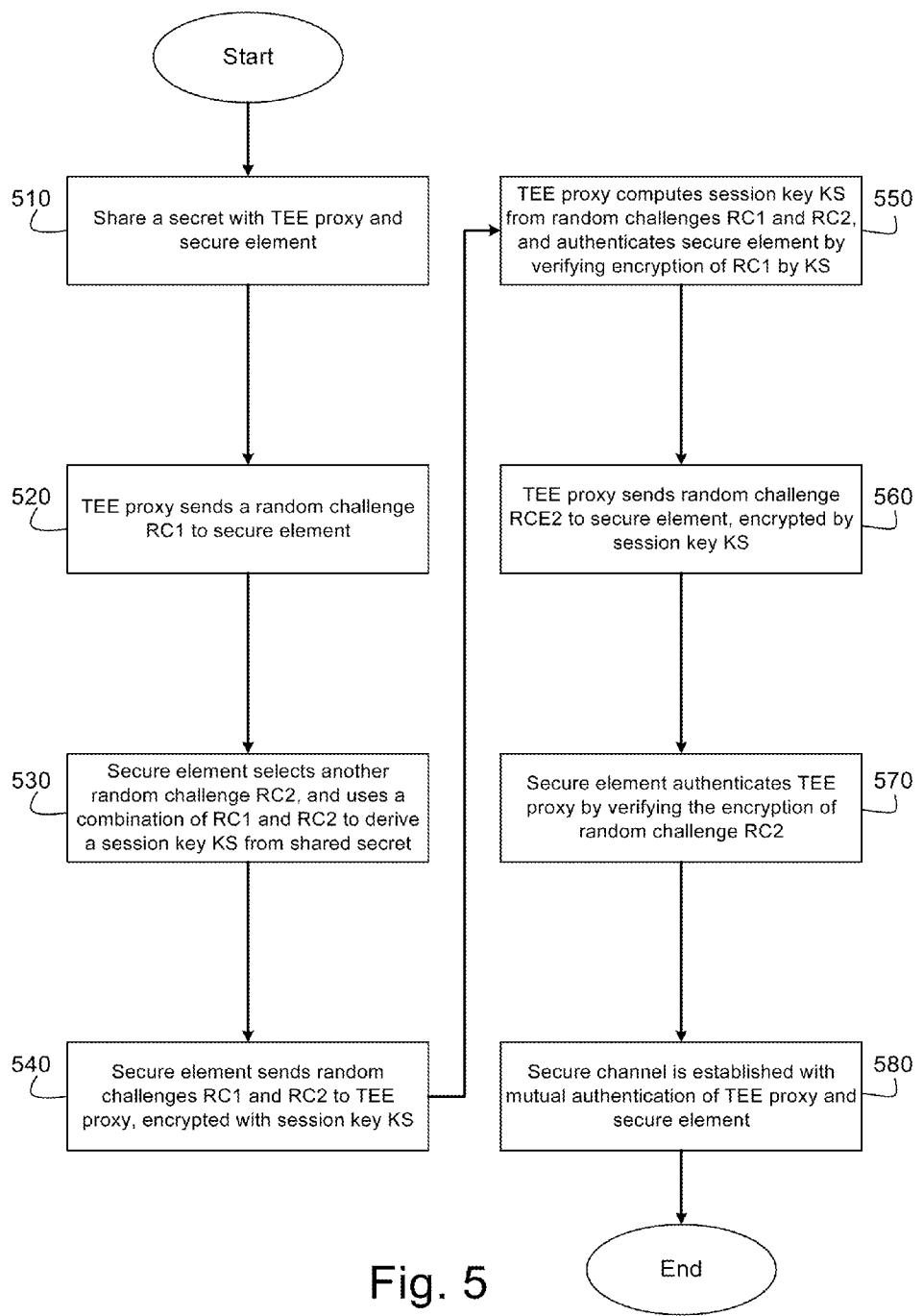
FIG. 5 illustrates a flow diagram of the functionality of a distributed TEE module that establishes a secure session between a TEE proxy and a secure element, according to an embodiment of the invention.

FIG. 4 illustrates a flow diagram of the functionality of a distributed TEE module (such as distributed TEE module 16 of FIG. 1) that implements a distributed TEE, according to an embodiment of the invention. In one embodiment, the functionality of the flow diagram of FIG. 4, as well as the functionality of the flow diagram of FIG. 5, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 405. At 405, a client application (such as one of client applications 214, 215, 216, and 217 of FIG. 3) sends a request to establish a session between the client application and a trusted application (such as one of trusted applications 253, 254, 262, and 263 of FIG. 3) to a TEE proxy (such as TEE proxy 245 of FIG. 3). According to the embodiment, the client application is executed within an operating system environment (such as rich operating system environment 210 of FIG. 3) of a device. Further, in accordance with the embodiment, the TEE proxy is executed within a first TEE (such as TEE 220 of FIG. 3) of the device. Additionally, in accordance with the embodiment, the trusted application is executed within a second TEE (such as TEE 280 of FIG. 3) of a secure element (such as secure element 34 of FIG. 1, or tamper-resistant hardware platform 270 of FIG. 3). In one embodiment, the client application can send the request to establish the session by calling a function of a TEE client API (such as TEE client API 212 of FIG. 3). The flow proceeds to 410.

At 410, the TEE proxy: (a) receives the request to establish the session from the client application; (b) looks up the trusted application's universally unique identifier ("UUID") within a table that is stored within the TEE proxy; and (c) retrieves a corresponding application identifier ("AID") from the table that is stored within the TEE proxy. The flow proceeds to 415.

At 415, the TEE proxy selects the trusted application by sending a "SELECT" application protocol data unit ("APDU") command to the trusted application. The "SELECT" command can be sent to the trusted application using the AID retrieved from the table stored within the TEE proxy. In one embodiment, the "SELECT" command is sent to the trusted application using a Java TEE API (such as Java TEE API 255 of FIG. 3). The flow proceeds to 420.

At 420, the trusted application sends a response to the request to establish the session to the TEE proxy. In one embodiment, the response to the request to establish the session is sent to the TEE proxy using the Java TEE API. The flow proceeds to 425.

At 425, the TEE proxy sends the response to the request to establish the session to the client application. In one embodiment, the response to the request to establish the session is sent to the client application using the TEE client API. Thus, the session between the client application and the trusted application on the secure element is established through the TEE proxy. The flow proceeds to 430.

At 430, the client application sends a request to execute an operation to the TEE proxy. In one embodiment, the request to execute the operation is sent to the TEE proxy using the TEE client API. The flow proceeds to 435.

At 435, the TEE proxy: (a) receives the request to execute the operation; (b) creates an APDU; and (c) stores the request to execute the operation within the APDU. The flow proceeds to 440.

At 440, the TEE proxy sends the APDU to the trusted application. In one embodiment, the APDU is sent to the trusted application using the Java TEE API. Further, in one embodiment, the Java Card API is also used to send the APDU to the trusted application. The flow proceeds to 442.

At 442, the trusted application processes the incoming APDU by analyzing its content and performing an appropriate action. The flow proceeds to 445.

At 445, while processing the incoming APDU, the trusted application determines whether it requires a TEE kernel (such as TEE kernel 240 of FIG. 3) to perform an operation. If the trusted application requires the TEE kernel to perform an operation, the flow proceeds to 450. If the trusted application does not require the TEE kernel to perform an operation, the flow proceeds to 465.

At 450, the trusted application sends an APDU to the TEE proxy, where the APDU includes: (a) a description of the operation that the trusted application requires the TEE kernel to perform; and (b) a status word. In one embodiment, the APDU is sent to the TEE proxy using the Java TEE API. Further, in one embodiment, the Java Card API is also used to send the APDU to the TEE proxy. The flow proceeds to 455.

At 455, the TEE proxy: (a) identifies the status word stored within the APDU; (b) decodes the description of the operation stored within the APDU; and (c) has the TEE kernel perform the operation. The flow proceeds to 460.

At 460, the TEE proxy: (a) creates an APDU; (b) stores a result of the operation that was performed by the TEE kernel within the APDU; and (c) sends the APDU to the trusted application. In one embodiment, the APDU is sent to the trusted application using the Java TEE API. Further, in one embodiment, the Java Card API is also used to send the APDU to the trusted application. The flow returns to 442.

At 465, the trusted application: (a) stores a response to the request to execute the operation within an APDU; and (b) sends the APDU to the TEE proxy. In one embodiment, the APDU is sent to the TEE proxy using the Java TEE API. Further, in one embodiment, the Java Card API is also used to send the APDU to the TEE proxy. The flow proceeds to 470.

At 470, the TEE proxy retrieves the response to the request to execute the operation from the APDU. The flow proceeds to 475.

At 475, the TEE proxy sends the response to the request to execute the operation to the client application. In one embodiment, the response to the request to execute the operation is sent to the client application using the TEE client API. The flow proceeds to 480.

At 480, the client application determines whether it requires the trusted application to perform an additional operation. If the client application requires the trusted application to perform an additional operation, the flow returns to 430. If the client application does not require the trusted application to perform an additional operation, the flow ends.

FIG. 5 illustrates a flow diagram of the functionality of a distributed TEE module that establishes a secure session between a TEE proxy and a secure element, according to an embodiment of the invention. The flow begins and proceeds to 510. At 510, a TEE proxy (such as TEE proxy 245 of FIG. 3) is paired with a secure element (such as secure element 34 of FIG. 1 or tamper-resistant hardware platform 270 of FIG. 3) by randomly selecting a shared secret, and sharing the secret with the TEE proxy and the secure element. The flow proceeds to 520.

At 520, when a session is started, and the TEE proxy and the secure element start a new secure session, the TEE proxy sends a random challenge RC1 to the secure element. The flow proceeds to 530.

At 530, the secure element selects another random challenge RC2, and uses a combination of random challenge RC1 and random challenge RC2 to derive a session key KS from the shared secret. The flow proceeds to 540.

At 540, the secure element sends the random challenges RC1 and RC2 to the TEE proxy, where the random challenges RC1 and RC2 are encrypted with the session key KS. The flow proceeds to 550.

At 550, the TEE proxy computes the session key KS from the random challenges RC1 and RC2 and the shared secret, and authenticates the secure element by verifying the encryption of the random challenge RC1 by the session key KS. The flow proceeds to 560.

At 560, the TEE proxy sends the random challenge RC2 to the secure element, where the random challenge RC2 is encrypted by the session key KS. The flow proceeds to 570.

At 570, the secure element authenticates the TEE proxy by verifying the encryption of the random challenge RC2. The flow proceeds to 580.

At 580, the secure channel is established with a mutual authentication of the TEE proxy and the secure element. The flow then ends. During the entire session, the content exchange between the TEE proxy and the secure element may be encrypted for confidentiality and/or signed for integrity, depending on a device's security requirements. The session ends when the device is shut down or reset, when the secure element is removed (if it is removable), or on an explicit request from a user of the device.

Thus, according to an embodiment, a distributed TEE can be provided where a first TEE component can be implemented as a TEE proxy executed on a device, and a second TEE component can be implemented as a TEE executed on a secure element, where the TEE proxy can act as a proxy between the TEE executed on the secure element, and an execution environment of the device. By leveraging the security features of the secure element, the distributed TEE can improve the security of the TEE, and thus, can meet higher security requirements of certain industries, such as payment or health care. Further, the distributed TEE can leverage the existing infrastructure of the secure element, since secure elements are present in many devices. Finally, the distributed TEE can provide an interoperable solution that can be provided for different hardware architectures, which can provide more flexibility to device manufacturers.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, cause the processor to implement a distributed trusted execution environment, the implementing comprising:
receiving, by a trusted execution environment proxy executed within a first trusted execution environment of a device, a request to establish a session between a client application executed within an operating system environment of the device and a trusted application executed within a second trusted execution environment of a secure element, wherein the request to establish the session is received from the client application;
selecting, by the trusted execution environment proxy, the trusted application;
sending, by the trusted execution environment proxy, the request to establish the session between the client application and the trusted application to the trusted application;
receiving, by the trusted execution environment proxy, a response to the request to establish the session from the trusted application;
sending, by the trusted execution environment proxy, the response to the request to establish the session to the client application, wherein the session between the client application and the trusted application is established through the trusted execution environment proxy;
storing, by the trusted execution environment proxy, a request to execute an operation within a first application protocol data unit;
sending, by the trusted execution environment proxy, the first application protocol data unit to the trusted application; and
receiving, by the trusted execution environment proxy, a second application protocol data unit from the trusted application, wherein the second application protocol data unit comprises a response to the request to execute the operation.

2. The non-transitory computer-readable medium of claim 1, wherein the trusted execution environment proxy comprises a proxy application configured to communicate with one or more trusted applications executed within the second trusted execution environment of the secure element.

3. The non-transitory computer-readable medium of claim 1, the implementing further comprising:
receiving, by the trusted execution environment proxy, the request to execute the operation from the client application;
retrieving, by the trusted execution environment proxy, the response to the request to execute the operation from the second application protocol data unit; and
sending, by the trusted execution environment proxy, the response to the request to execute the operation to the client application.

4. The non-transitory computer-readable medium of claim 3, the implementing further comprising:
receiving, by the trusted execution environment proxy, a third application protocol data unit from the trusted application, wherein the third application protocol data unit comprises an operation description and a status word;
identifying, by the trusted execution environment proxy, the status word;
retrieving, by the trusted execution environment proxy, the operation description from the third application protocol data unit;
performing, by the trusted execution environment proxy, the operation within a trusted execution environment kernel;
storing, by the trusted execution environment proxy, the result of the operation within a fourth application protocol data unit; and
sending, by the trusted execution environment proxy, the fourth application protocol data unit to the trusted application.

5. The non-transitory computer-readable medium of claim 1, the implementing further comprising establishing a secure session between the trusted execution environment proxy and the secure element.

6. The non-transitory computer-readable medium of claim 5, wherein the establishing the secure session further comprises:
sharing a secret with the trusted execution environment proxy and the secure element;
sending, by the trusted execution environment proxy, a first random challenge to the secure element;

receiving, by the trusted execution environment proxy, the first random challenge and a second random challenge from the secure element, wherein the first random challenge and the second random challenge are encrypted with a session key, and wherein the secure element derives the session key from the shared secret using a combination of the first random challenge and the second random challenge;

computing, by the trusted execution environment proxy, the session key from the first random challenge, the second random challenge, and the shared secret;

authenticating, by the trusted execution environment proxy, the secure element by verifying the encryption of the first random challenge using the session key;

sending, by the trusted execution environment proxy, the second random challenge to the secure element, wherein the second random challenge is encrypted using the session key, and wherein the secure element authenticates the trusted execution environment proxy by verifying the encryption of the second random challenge.

7. The non-transitory computer-readable medium of claim 1, wherein the secure element is embedded within the device.

8. The non-transitory computer-readable medium of claim 1, wherein the secure element is removable from the device.

9. The non-transitory computer-readable medium of claim 1, wherein the secure element comprises at least one of, a chipset, a secured microcontroller, a universal integrated circuit card, a memory card, a smart card, or a subscriber identity module card.

10. The non-transitory computer-readable medium of claim 1, the implementing further comprising establish a secure connection between a Java trusted execution environment application programming interface and a Java Card application programming interface.

11. The non-transitory computer-readable medium of claim 1, the implementing further comprising:
receiving, by the secure element, the request to establish the session between the client application executed within the operating system environment of the device and the trusted application executed within the second trusted execution environment of the secure element, wherein the request to establish the session is received from the trusted execution environment proxy executed within the first trusted execution environment of the device; and sending, by the secure element, a response to the request to establish the session to the trusted execution environment proxy.

12. The non-transitory computer-readable medium of claim 11, the implementing further comprising:
receiving, by the secure element, the first application protocol data unit from the trusted execution environment proxy, wherein the first application protocol data unit comprises the request to execute the operation;
storing, by the secure element, the response to the request to execute the operation within the second application protocol data unit; and
sending, by the secure element, the second application protocol data unit to the trusted execution environment proxy.

13. The non-transitory computer-readable medium of claim 12, the implementing further comprising establishing a secure session between the secure element and the trusted execution environment proxy;
wherein the establishing the secure session further comprises:

sharing a secret with the trusted execution environment proxy and the secure element;
receiving, by the secure element, a first random challenge from the trusted execution environment proxy;
selecting, by the secure element, a second random challenge;
deriving, by the secure element, a session key from the shared secret using a combination of the first random challenge and the second random challenge;
sending, by the secure element, the first random challenge and the second random challenge to the trusted execution environment proxy, wherein the first random challenge and the second random challenge are encrypted with the session key;
receiving, by the secure element, the second random challenge from the trusted execution environment proxy, wherein the second random challenge is encrypted using the session key, and wherein the trusted execution environment proxy authenticates the secure element by verifying the encryption of the first random challenge using the session key; and
authenticating, by the secure element, the trusted execution environment proxy by verifying the encryption of the second random challenge.

14. A computer-implemented method for implementing a distributed trusted execution environment, the computer-implemented method comprising:
receiving, by a trusted execution environment proxy executed within a first trusted execution environment of a device, a request to establish a session between a client application executed within an operating system environment of the device and a trusted application executed within a second trusted execution environment of a secure element, wherein the request to establish the session is received from the client application;
selecting, by the trusted execution environment proxy, the trusted application;
sending, by the trusted execution environment proxy, the request to establish the session between the client application and the trusted application to the trusted application;
receiving, by the trusted execution environment proxy, a response to the request to establish the session from the trusted application;
sending, by the trusted execution environment proxy, the response to the request to establish the session to the client application, wherein the session between the client application and the trusted application is established through the trusted execution environment proxy;
storing, by the trusted execution environment proxy, a request to execute an operation within a first application protocol data unit;
sending, by the trusted execution environment proxy, the first application protocol data unit to the trusted application;
receiving, by the trusted execution environment proxy, a second application protocol data unit from the trusted application, wherein the second application protocol data unit comprises a response to the request to execute the operation.

15. The computer-implemented method of claim 14, further comprising:
receiving, by the trusted execution environment proxy, the request to execute the operation from the client application;

retrieving, by the trusted execution environment proxy, the response to the request to execute the operation from the second application protocol data unit; and sending, by the trusted execution environment proxy, the response to the request to execute the operation to the client application.

16. The computer-implemented method of claim 15, further comprising:

receiving, by the trusted execution environment proxy, a third application protocol data unit from the trusted application, wherein the third application protocol data unit comprises an operation description and a status word;

identifying, by the trusted execution environment proxy, the status word;

retrieving, by the trusted execution environment proxy, the operation description from the third application protocol data unit;

performing, by the trusted execution environment proxy, the operation within a trusted execution environment kernel;

storing, by the trusted execution environment proxy, the result of the operation within a fourth application protocol data unit; and sending, by the trusted execution environment proxy, the fourth application protocol data unit to the trusted application.

17. The computer-implemented method of claim 14, further comprising establishing a secure session between the trusted execution environment proxy and the secure element.

18. The computer-implemented method of claim 17, wherein the establishing the secure session further comprises:

sharing a secret with the trusted execution environment proxy and the secure element;

sending, by the trusted execution environment proxy, a first random challenge to the secure element;

receiving, by the trusted execution environment proxy, the first random challenge and a second random challenge from the secure element, wherein the first random challenge and the second random challenge are encrypted with a session key, and wherein the secure element derives the session key from the shared secret using a combination of the first random challenge and the second random challenge;

computing, by the trusted execution environment proxy, the session key from the first random challenge, the second random challenge, and the shared secret;

authenticating, by the trusted execution environment proxy, the secure element by verifying the encryption of the first random challenge using the session key;

sending, by the trusted execution environment proxy, the second random challenge to the secure element, wherein the second random challenge is encrypted using the session key, and wherein the secure element authenticates the trusted execution environment proxy by verifying the encryption of the second random challenge.

19. The computer-implemented method of claim 14, further comprising:

receiving, by the secure element, the request to establish the session between the client application executed within the operating system environment of the device and the trusted application executed within the second trusted execution environment of the secure element, wherein the request to establish the session is received from the trusted execution environment proxy executed within the first trusted execution environment of the device; and sending, by the secure element, a response to the request to establish the session to the trusted execution environment proxy.

20. The computer-implemented method of claim 19, further comprising:

receiving, by the secure element, the first application protocol data unit from the trusted execution environment proxy, wherein the first application protocol data unit comprises the request to execute the operation;

storing, by the secure element, the response to the request to execute the operation within the second application protocol data unit; and sending, by the secure element, the second application protocol data unit to the trusted execution environment proxy.

21. The computer-implemented method of claim 19, further comprising establishing a secure session between the secure element and the trusted execution environment proxy;

wherein the establishing the secure session further comprises:

sharing a secret with the trusted execution environment proxy and the secure element;

receiving, by the secure element, a first random challenge from the trusted execution environment proxy;

selecting, by the secure element, a second random challenge;

deriving, by the secure element, a session key from the shared secret using a combination of the first random challenge and the second random challenge;

sending, by the secure element, the first random challenge and the second random challenge to the trusted execution environment proxy, wherein the first random challenge and the second random challenge are encrypted with the session key;

receiving, by the secure element, the second random challenge from the trusted execution environment proxy, wherein the second random challenge is encrypted using the session key, and wherein the trusted execution environment proxy authenticates the secure element by verifying the encryption of the first random challenge using the session key; and authenticating, by the secure element, the trusted execution environment proxy by verifying the encryption of the second random challenge.

22. A system, comprising:

a processor;

a trusted execution environment proxy, executed within a first trusted execution environment;

a secure element operatively coupled to the trusted execution environment proxy;

a request reception module configured to receive a request to establish a session between a client application executed within an operating system environment of a device and a trusted application executed within a second trusted execution environment of the secure element, wherein the request to establish the session is received from the client application;

a selection module configured to select the trusted application;

a request transmission module configured to send the request to establish the session between the client application and the trusted application to the trusted application;

a response reception module configured to receive a response to the request to establish the session from the trusted application;

a response transmission module configured to send the response to the request to establish the session to the client application, wherein the session between the client application and the trusted application is established through the trusted execution environment proxy;

an application protocol data unit storage module configured to store a request to execute an operation within a first application protocol data unit;

an application protocol data unit transmission module configured to send the first application protocol data unit to the trusted application; and an application protocol data unit reception module configured to receive a second application protocol data unit from the trusted application, wherein the second application protocol data unit comprises a response to the request to execute the operation.

23. The system of claim 22, further comprising:

an operation request reception module configured to receive the request to execute the operation from the client application;

an operation response reception module configured to receive the response to the request to execute the operation from the second application protocol data unit; and an operation response transmission module configured to send the response to the request to execute the operation to the client application.

24. The system of claim 23, wherein the application protocol data unit reception module is further configured to receive a third application protocol data unit from the trusted application, wherein the third application protocol data unit comprises an operation description and a status word;

the system further comprising:

an identification module configured to identify the status word;

a retrieval module configured to retrieve the operation description from the third application protocol data unit;

an operation module configured to perform the operation within a trusted execution environment kernel; and an operation result storage module configured to store the result of the operation within a fourth application protocol data unit;

wherein the application protocol data unit transmission module is further configured to send the fourth application protocol data unit to the trusted application.

25. The system of claim 22, further comprising a secure session module configured to establish a secure session between the trusted execution environment proxy and the secure element.

26. The system of claim 22, wherein the secure element is further configured to receive the request to establish the session between the client application executed within the operating system environment and the trusted application executed within the second trusted execution environment of the secure element, wherein the request to establish the session is received from the trusted execution environment proxy executed within the first trusted execution environment;

wherein the secure element is further configured to send a response to the request to establish the session to the trusted execution environment proxy.

27. The system of claim 26, wherein the secure element receives the first application protocol data unit from the trusted execution environment proxy, wherein the first application protocol data unit comprises the request to execute the operation;

wherein the secure element stores a response to the request to execute the operation within the second application protocol data unit; and wherein the secure element sends the second application protocol data unit to the trusted execution environment proxy.

28. The system of claim 26, wherein the secure element is further configured to establish a secure session between the secure element and the trusted execution environment proxy.

* * * * *